April 17, 1956     E. J. DUFAULT     2,742,488
PROCESS FOR RENDERING ANIMAL FATS
Filed Sept. 25, 1952
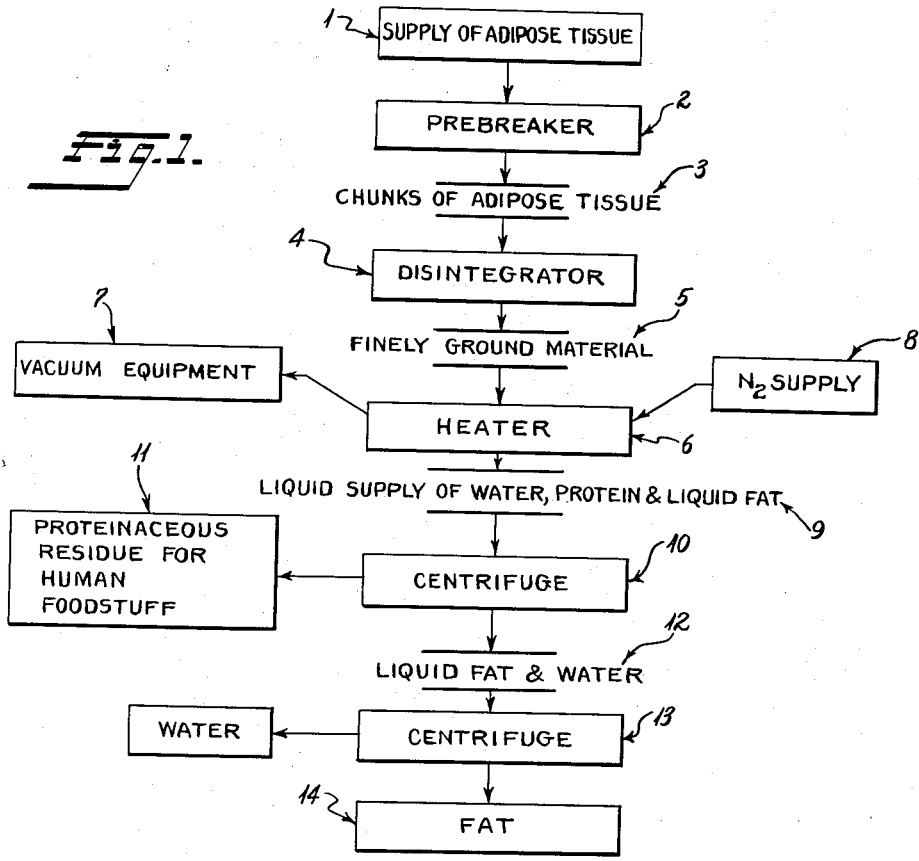
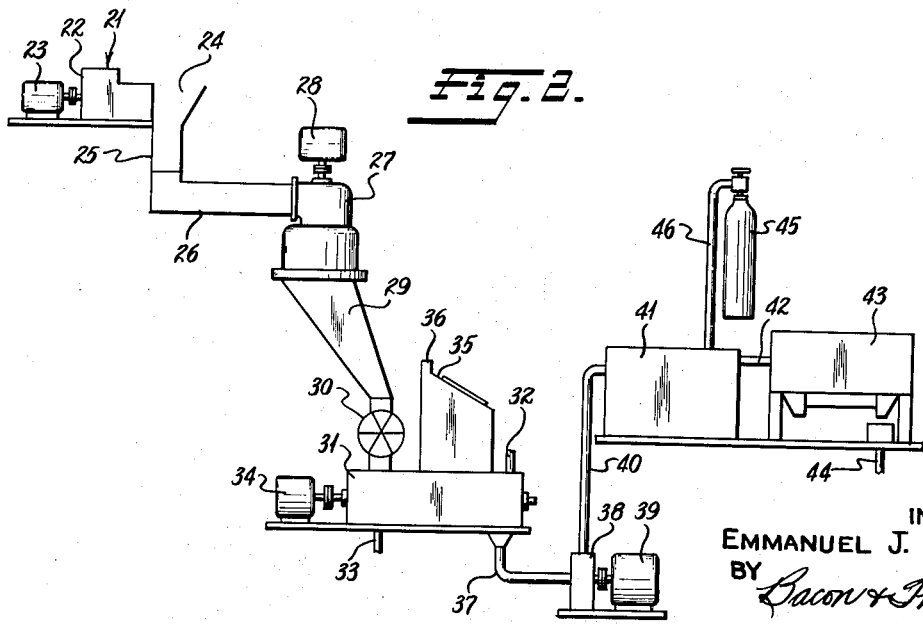
INVENTOR
EMMANUEL J. DUFAULT
BY Bacon & Thomas
ATTORNEYS

2,742,488

PROCESS FOR RENDERING ANIMAL FATS

Emmanuel J. Dufault, Weston, Ontario, Canada, assignor to Canada Packers, Limited, Toronto, Ontario, Canada Application September 25, 1952, Serial No. 311,455

15 Claims. (Cl. 260—412.6)

This invention relates to a process for rendering animal fat.

In rendering fatty tissue for the production of lard and tallow, in addition to obtaining maximum yield of fat, the process, in order to be satisfactory, must also produce a light-colored fat having a minimum of free fatty acids, a satisfactory odor and flavor, and good keeping qualities.

The usual methods used today in the packing industry for rendering fats are commonly known as the "wet rendering" and "dry rendering" processes. At the present time, more than eighty per cent of all edible animal fats are wet or "steam" rendered.

In essence, the wet rendering of animal fats consists in the treatment of the fat with live steam at a pressure of 30 to 60 pounds gauge at the relatively high temperature of 220° to 300° F. to rupture the cell walls of the tissue, thereby freeing the fat and coagulating the proteinaceous portion. The physical characteristics of the proteinaceous portion are changed by the heating so that it will sink in a layer of water while the freed fat will float on top of the layer. The high temperatures are necessary to effectively rupture the tissue cell walls, and more water is needed than that supplied by the tissue in order to effect the separation of the fat and protein.

The process has several practical disadvantages. A considerable proportion of the protein is soluble in the water layer, necessitating extensive recovery systems which are expensive and which, in themselves, do not result in a complete recovery of the dissolved protein. Because of the high temperatures, some of the protein is broken down and is lost entirely. The fraction of the protein which sinks to the bottom of the water layer and which is usually sold for animal feed, is not entirely free of fat. Since this portein fraction is sold on a protein basis, the fat remaining offers no return to the manufacturer and is not necessary for the animal. In addition, there is the difficulty of handling this rapidly souring, wet tankage.

The high temperatures and pressures and the excessive amounts of water used in the wet rendering process result in hydrolysis of the fat and in an increase in the free fatty acid content, which causes a lowering of the smoke point. In addition, the fat has a considerable tendency to develop off flavors. The wet rendering process is also inherently a batch method.

An example of a typical analysis of lard produced by wet rendering methods is as follows: color—6 yellow, 0.9 red; free fatty acid—0.45%; keeping time—4½ hours. The free fatty acid and color values are determined according to the Official Methods of the American Oil Chemists' Society, and the values for keeping time are a measure of the stability of the fat as determined by the Swift test described in detail in the article by A. E. King, H. L. Roscher, and W. H. Irwin, which appeared in the Oil and Soap Journal, volume 10, No. 6, pages 105–109 (1933), a peroxide value of 20 being used as the end point.

The flavor of the lard produced by this method is distinctive and is usually described as meaty and pork-like. An improved quality product would have less color, a lower free fatty acid content, a longer keeping time, and less flavor.

In the dry rendering process, the raw pieces of fat, or a mixture of raw fat and bone, are crushed and placed in a horizontal jacketed cooker which is usually heated with steam. The charge is agitated with rotating paddles and as the heat is applied the moisture which was included in the tissues is evaporated, making it possible to utilize the temperature of the mass as a guide for indicating the approximate percentage of moisture remaining in the material. The cooker is usually a closed vessel with an exhaust which may lead to a vacuum system or to the atmosphere, the process being capable of operation either under a partial vacuum or at atmospheric pressure.

When most of the water has been boiled away, the process is stopped and the material run onto a perforated screen. The fat flows through the perforations while the solid material remains on the surface and is further pressed to remove excess fat. The cooking has driven off the water and, by breaking down the cell walls, has freed the fat. The solid proteinaceous material resulting from both the wet rendering and dry rendering processes may be used for human consumption if the processes are carried out under very critical conditions but it is not usually considered palatable.

The protein recovery with the dry rendering system of processing is much more complete than with the wet rendering procedure described previously, but this process also has many disadvantages. It is primarily a batch process having a technique of operation which is difficult to learn. The fat produced is often dark colored and, while the protein may be used for human consumption, it is not considered a good foodstuff. Since essentially all the water is evaporated, steam consumption is high and, as the fat is exposed to the air for considerable periods of time, oxidation takes place to deleteriously affect the flavor.

A typical analysis of the lard produced by the dry rendering process would fall within the following limits: color—1 to 5 red; free fatty acid—0.15% to 0.35%; and keeping time—3 to 5 hours. The red reading for color is more salient than the yellow reading.

Recently there have been attempts made to continuously render animal fats by means of a grinding and low temperature heating process which, it is claimed, substantially increases the fat yield and improves the quality of the lard. Such processes include a fine grinding of the fat-bearing tissue, followed by a heating at atmospheric pressure to a temperature sufficient to bring about liquefaction of the fat component of the tissue. Separation is then effected by gravitation or by a centrifuge. Although these processes may be continuous, they possess several serious disadvantages. The grinding of the raw fat causes substantial aeration of the resulting creamy material and the thus aerated protein portion of this material will settle very slowly, thereby making subsequent separation difficult. The aeration of the fat portion causes rapid oxidation which detrimentally affects both the stability and the flavor of the resulting lard.

It is an object of the present invention to render animal fat by a new method in which the temperature is not elevated substantially above that necessary to coagulate the protein component of the fatty tissue.

Another object of this invention is to render animal fat by a new process which minimizes oxidation in order to protect the stability and flavor of the fat.

It is a further object of the present invention to render animal fat by means of a process which, for practical purposes, eliminates hydrolysis along with its deleterious production of free fatty acids.

It is a still further object of this invention to render animal fat by means of a continuous process which is capable of being used on a large scale and under sanitary conditions while utilizing a minimum of floor space and labor.

Still another object is to render animal fats by means of a process which may be rapidly carried out to handle large quantities of tissue at a very low cost.

It is a further important object of this invention to render animal fat by means of a process which yields a residue of proteinaceous tissue which is quite edible and suitable for a human foodstuff.

According to the new process, fats in their natural state, i. e., as removed from the animal carcasses, are first cut or broken into pieces which may be admitted with facility to the inlet of a grinder or mill which mechanically disintegrates the fat cells by pounding, tearing, cutting, shredding, shearing, etc. This mechanical disruption of the cell walls replaces the heat required for this purpose in the above-described wet and dry rendering processes.

The ground material is next placed in a closed heated vessel containing an agitator. A vacuum is drawn on the vessel and agitation started, the vacuum being so regulated that the moisture of the ground material does not boil, although on some occasions it may be desirable to allow a small percentage of the moisture to boil off in order to regulate the temperature of the mass. It will be noted that a large percentage of the moisture is retained in the mass during the vacuum operation. The purpose of the vacuum is to remove from the mixture the relatively large quantities of entrained air which were incorporated during the mechanical disintegration as well as the dissolved oxygen contained in the original tissue. The removal of such air is highly important to the success of the process for two distinct reasons; first, because removal of air from the protein allows it to subsequently settle very rapidly, and second, because removal of air from the fat avoids oxidation with its noxious effect on the flavor.

The material is allowed to remain in the vessel under vacuum until it has been completely liquified, at which time the internal pressure in the vessel is brought to atmospheric by bleeding in an inert gas such as nitrogen, which partially replaces the entrained air and thus further insures against oxidation. The change to atmospheric pressure is necessary in order to allow heating to coagulation temperatures without the loss of an excessive amount of water, and while the inert gas atmosphere is not indispensable it eliminates the oxidation which would otherwise occur in air and, accordingly, is to be preferred. The heating and agitation of the now nitrogen blanketed mass are continued until it reaches a temperature of between 145° F. and 180° F., which causes the proteinaceous material to coagulate and lose some of its slimy nature, making subsequent separation much more simple and economical.

After the material has reached the foregoing temperature the fat can be separated from the protein and water by any one of several methods. Because the present process is carried out without the addition of any water to the adipose tissue and the heat treatment is mild both as to time and temperature, hydrolysis is practically eliminated and the free fatty acid content is kept to a minimum. The lard and oleo stock produced have a bland more pleasing taste and a longer keeping time than products obtained from the conventional rendering processes. While present rendering methods produce a protein fraction which, though edible, is not considered a good foodstuff for human consumption, the low temperature and rapid processing of the new process result in a protein residue which is quite edible and saleable.

Referring now to the drawings, Fig. 1 represents a flow diagram of the new process, and Fig. 2 shows a diagram of equipment suitable for carrying out the process on a continuous basis.

Referring to Fig. 1, a supply of adipose tissue, i. e., raw fat 1, is fed into a "prebreaker" 2 of any suitable design, as for example a "Rietz Prebreaker" (manufactured by the Rietz Manufacturing Co. of Santa Rosa, California), which reduces the fat to small chunks 3 for convenient feeding to a disintegrator. While this prebreaking step is not essential, it is very expeditious and convenient and facilitates handling of the fatty tissue. The small chunks of fat are fed to a disintegrator 4 of any suitable type which will grind the material to a fine cream-like consistency. A fixed hammer type mill which grinds the material through a screen having perforations from about $\frac{1}{16}$ to $\frac{1}{2}$ inch in diameter is satisfactory and, as one example, a "Rietz Disintegrator," manufactured by the aforementioned Rietz Manufacturing Co., may be used.

The finely ground material 5 from the disintegrator is next fed to a heater 6 having an agitator, a vacuum system 7, and a nitrogen supply 8. An absolute pressure between 1 and 10 inches of mercury, absolute, is maintained in the heater 6 during the following heating step, with a range of from 2 to 4 inches of mercury, being the most desirable. The material under such vacuum is raised to a temperature of from 90° F. to 140° F. depending on the type of fat. For example, beef fats, being more saturated and having a higher melting point, require a higher temperature than hog fats. Generally, the fat should be heated to a high enough temperature to melt the fat and produce a liquid material. The time of heating in vacuo depends on the amount of material being heated and on the type of apparatus, and will range from 2 to 30 minutes, although in most cases the time will be between 5 and 10 minutes.

At the termination of this first heating period nitrogen from the supply 8 is bled into the heater 6 to bring the pressure to atmospheric. Thereafter, the vacuum system 7 is disconnected and the fat kept under a blanket of nitrogen while the temperature is raised to between 145° and 180° F. in order to coagulate the protein and make it more filterable. The time necessary to reach 180° F. will again depend on the amount of material being heated and on the apparatus, but in the normal instance will vary between 5 and 10 minutes. For beef fat a coagulation temperature of from 145° F. to 150° F. has been found most satisfactory, whereas for hog fats the most satisfactory temperature has been found to be between 160° F. to 180° F. When the desired coagulation temperature of the material has been reached, the coagulation step is discontinued and the material then sent on to the separation steps.

One satisfactory method of separating the fat from the protein and water is that shown in the flow diagram, wherein the slurry of fat, protein and water 9 is fed to a centrifuge 10. Such centrifuge may be of the imperforate basket type or of the continuous type for separating solids and liquids. The resulting proteinaceous residue 11 may thus be effectively separated from the fat so as to have the appearance of a light-colored ground meat product.

The liquid portion 12 may be freed of excess water by being fed to a clarifying centrifuge 13. The resulting product 14 of this last centrifuge is a fat having a very good keeping time, low color, low free fatty acid content, and mild flavor.

While one method of separating the fat from the protein and water has been described in connection with the flow sheet, it will be readily appreciated that many other methods might be used with equal success. Thus, for instance, the slurry may be given a coarse filtration through a cotton cloth and the semi-clarified liquid then further clarified by passing it through a centrifuge such as a Sharples Supercentrifuge (manufactured by the Sharples Corporation of Philadelphia, Pennsylvania), or, alternately, the liquid may be further clarified by filtration using a diatomaceous earth filter aid. In some cases it is advantageous to allow the material to settle after the coarse filtration and before the final clarification, and to drain off the water which collects on the bottom.

The protein residue which is removed from the fat by such a coarse filtration contains a considerable quantity of fat. A considerable portion of such fat can be recovered by wrapping the residue in canvas duck and subjecting it to pressure, usually by means of a hydraulic press, while keeping the residue at a temperature above the liquefying point of the fat. The residue after pressing is light-colored, semi-solid, slightly spongy in texture, and has average analysis of: moisture—62%, fat—17%, protein—21%.

It has been found that to produce a lard with a low free fatty acid content from some internal hog fats, the fats should be preheated to denature the fat-splitting enzymes before being processed according to the new method. A short heat treatment has been found very effective for this purpose and is hereafter described in connection with illustrative Example 2.

Following are several examples of the new process as applied to various type fats:

Example 1

15 pounds of fresh derinded hog cutting fats were ground through a laboratory model Rietz Disintegrator (manufactured by the Rietz Manufacturing Co., of Santa Rosa, California). The ground material was then placed in a 12 liter glass reaction flask fitted with a glass agitator and having connections to vacuum and nitrogen systems.

The flask was partly immersed in a water bath and the internal pressure brought to 2 inches of mercury, absolute. The water bath was then heated to a temperature of 195° F. to 205° F. and the agitator started. The vacuum inside the flask was regulated with nitrogen so that the free moisture contained in the ground fatty material did not boil.

When all the material in the flask was fluid, the pressure was brought to atmospheric with nitrogen, and heating and agitation were continued until the temperature of the slurry was brought to 180° F. At that time heating and agitation were stopped, the warm slurry poured through a cotton cloth, and the filtrate given a fine filtration using a diatomaceous earth filter aid. The residue which had collected in the cotton cloth was wrapped in canvas duck and pressed in a hydraulic press, the fat which was pressed from the residue being added to the filtrate.

The analysis of the fat was: color—2 yellow, 0.3 red; free fatty acid—0.12%; keeping time—8 hours. The lard had a very mild flavor and was much superior to lard rendered by usual methods.

The protein residue was analyzed with the following results: protein—24.8%; fat—19.5%; moisture—55.8%.

Example 2

1600 grams of a mixture of internal hog fats (ruffle fat, gut fat, and caul fat) was placed in a container of water at a temperature of 180° F. and the water maintained at this temperature for 20 minutes in order to denature the fat-splitting enzymes. The fats were then removed from the water and 1300 grams of hog leaf fat added to them.

The fats were ground and processed as in Example 1. The protein residue was not analyzed in this case, but the lard was analyzed with the following results: color—1 yellow, 0.1 red; free fatty acid—0.081%; keeping time—14 hours. The flavor of the product was very mild and was superior to lard produced by common rendering methods.

Example 3

A mixture of internal hog fats similar to Example 2 was processed as in Example 2 except that the slurry, after being heated to 180° F., was not filtered through a cotton cloth, but was placed in a basket-type centrifuge with an imperforate basket.

The slurry was slowly poured into the basket when the centrifuge had reached a moderate speed, the liquid being discharged from the top edge of the basket and the solids settling around the vertical walls. After the entire slurry had been added the centrifuge was stopped and the remaining liquid portion poured off.

The solids adhered to the sides of the bowl and, when removed, produced the following analysis: protein—16%; fat—13%; moisture—70%. The protein residue was light-colored, semi-firm, and had a mild pork-like odor.

Example 4

A portion of frozen hog back fat was processed similarly to Example 1 and the lard produced was analyzed with the following results: color—2 yellow, 0.1 red; free fatty acid—0.06%; keeping time—8 hours.

Example 5

Some portions of fresh, unchilled, internal beef fats (paunch fat and caul fat) were treated similarly to Example 1, except that the mass was brought to a temperature of 145° F. instead of 180° F.

The analysis of the fat produced, commonly called "oleo stock," was: color—22 yellow, 0.7 red; free fatty acid—0.18%; keeping time—9 hours. The flavor of this fat was very good as compared to that produced by normal methods.

Example 6

This was a repetition of Example 5 except that the following internal beef fats were processed: caul, ruffle, paunch, casing, kidney and pluck.

The fat produced had the following analysis: color—20 yellow, 1 red; free fatty acid—0.18%; keeping time—15 hours. The flavor was very good as compared to fat produced by normal procedures.

Example 7

Some beef external fats, several days old, were processed similarly to Example 5.

The fat produced had the following analysis: free fatty acid—0.24%; keeping time—5 hours. The fat produced had a very good flavor.

Fig. 2 illustrates apparatus suitable for continuously carrying out the process of the present invention. The raw fat is introduced at 21 into a suitable prebreaker 22, such as a Rietz Prebreaker, which is driven by a motor 23. The prebreaker reduces the size of the pieces of fatty material and the output of the prebreaker is then fed into a hopper 24 and thence through chute 25 to a feeder 26 which regulates the flow of coarse material. The feeder 26 feeds the chopped material to a suitable disintegrator 27, such as a Rietz Disintegrator, which is driven by a motor 28. The disintegrator reduces the material to a finely divided state and breaks the fat cells. The finely comminuted output of the disintegrator is fed by means of feed chute 29 to a rotary feeder 30 which introduces the material into a heater 31, the interior of which may be maintained under vacuum. The heater 31 may, for example, be a covered trough provided with a heating jacket and having agitating paddles to move the material forward. The agitating paddles may be driven by a motor 34 and the heating jacket may be supplied with either steam or hot water which is introduced through line 32 and removed through line 33. The heater 31 may be provided with a hood 35 having an outlet 36 from which the gases may be withdrawn to maintain the above mentioned vacuum. The liquid slurry from the heater 31 is removed through line 37 by a pump 38 driven by a motor 39, and is pumped through line 40 into a heater 41, which, for example, may be of the "Votator" type, i. e., may be a continuous heat exchanger with a moving blade to keep the heating surface free of coagulating protein. A nitrogen supply 45 is connected by means of line 46 to the heat exchanger 41 so that the deaerated material in the heat exchanger may be kept under a blanket of nitrogen. In this heater the slurry is heated to coagulate the protein and the heated mixture of fat protein and water is fed, via line 42, to a centrifuge 43, such as a Sharples "Super-D-Canter" (manufactured by the Sharples Manufacturing Company of Philadelphia, Pennsylvania), wherein the semi-solid protein material is separated from the liquid lard or tallow, which later is removed by means of line 44. The fat removed by line 44 can be given further treatment by several different methods, in order to remove moisture from the liquid fat and in order to remove a fine suspension of protein. Thus a process of settling and filtration is effective or, as an alternative, the fat may be subjected to continuous centrifugal separation. The resulting fat or lard, if the starting material is of high quality, is light-colored, contains a minimum of free fatty acids, is odorless, has a bland flavor and good keeping qualities.

Whereas the invention has been described in connection with particular embodiments, it will be understood that this is only for the purpose of explanation and that the invention is to be limited only by the spirit and scope of the appended claims.

What is claimed is:

1. A process of recovering the fat content from the adipose tissue of animals comprising; disintegrating the scraps of adipose tissue removed from the carcass during slaughtering to a finely ground, creamy consistency so as to rupture the walls of substantially all of the fat cells thereof, subjecting the resulting mass to a vacuum to deaerate said mass while at a temperature sufficient to liquefy said fat while retaining a large percentage of the moisture present in said mass, heating the liquid mass to a temperature sufficient to coagulate the protein content of said mass and then separating such coagulated protein from said liquid fat.

2. A process of recovering the fat content from the fatty tissues of animals comprising; mechanically rupturing substantially all of the fat cells of said tissues, heating the resulting mass under a vacuum to liquefy the fat content thereof and to deaerate the mass while retaining a large percentage of the moisture present in said mass, replacing said vacuum with an atmosphere of inert gas, elevating the temperature of said mass to coagulate the tissue content thereof and separating the liquid fat from the tissue content of the mass.

3. A process of separating animal fat from the proteinaceous tissue with which it naturally occurs which comprises; mechanically disintegrating the pieces of fatty material removed from the animals so as to rupture the walls of substantially all of the fat cells thereof, subjecting the resulting mass to a vacuum while at a temperature between 90° F. and 140° F. to liquefy and deaerate the fat while retaining a large percentage of the moisture present in said mass, heating the mass to a temperature sufficient to coagulate the proteinaceous tissue and then mechanically separating the liquid fat from the proteinaceous tissue.

4. A process of separating the fat content of adipose tissue from the proteinaceous portions thereof comprising; mechanically disintegrating the adipose tissue so as to rupture the walls of substantially all of the fat cells thereof, heating the resulting semi-liquid mass under a vacuum to a temperature between 90° F. and 140° F. in order to liquefy said fat and to deaerate said mass while retaining a large percentage of the moisture present in said mass, elevating the temperature of the liquid mass to a temperature between 145° F. and 180° F. and then mechanically separating the liquid fat from the proteinaceous tissue.

5. A process of recovering the fat content from the fatty tissue of animals comprising; mechanically disintegrating the fatty tissues so as to rupture the walls of substantially all of the fat cells thereof, heating the resulting mass under a vacuum to a temperature sufficient to liquefy the fat content thereof while retaining a large percentage of the moisture present in said mass, said vacuum being sufficient to deaerate said mass, further heating said mass out of contact with air to a temperature sufficient to coagulate the protein content of said mass, and mechanically separating the liquid fat from the tissue content of said mass.

6. A process of recovering the fat content of the adipose tissues of animals comprising; cutting the pieces of adipose tissue removed from animals into small chunks, disintegrating said small chunks so as to rupture the walls of substantially all of the fat cells thereof, heating the resulting mass under a vacuum to a temperature sufficient to liquefy the fat content thereof while retaining a large percentage of the moisture present in said mass, said vacuum being sufficient to de-aerate said mass, further heating said mass out of contact with air to a temperature sufficient to coagulate the protein content of said mass, and mechanically separating the liquid fat from the tissue content of said mass.

7. A process of recovering the fat content of the adipose tissue of animals comprising; mechanically disintegrating the adipose tissue so as to rupture the walls of substantially all of the fat cells thereof, heating the resulting semi-liquid mass under a vacuum to a temperature between 90° F. and 140° F. while retaining a large percentage of the moisture present in said mass whereby said fat is liquefied and said mass deaerated, bringing said mass to atmospheric pressure in an atmosphere of nitrogen, elevating the temperature of the nitrogen blanketed mass to between 145° F. and 180° F. and then mechanically separating the liquid fat from the tissue content of said mass.

8. A process of recovering the fat content of the adipose tissue of animals comprising; mechanically disintegrating the adipose tissue so as to rupture the walls of substantially all of the fat cells thereof, heating the resulting semi-liquid mass under a pressure of between 1 and 10 inches of mercury, absolute, to a temperature between 90° F. and 140° F. while retaining a large percentage of the moisture present in said mass, whereby said fat is liquefied and said mass deaerated, elevating the temperature of the deaerated mass to between 145° F. and 180° F. out of contact with air and then mechanically separating the liquid fat from the tissue content of said mass.

9. A process of recovering the fat content of the adipose tissue of animals comprising; mechanically disintegrating the adipose tissue so as to rupture the walls of substantially all of the fat cells thereof, heating the resulting semi-liquid mass under a pressure of between 2 and 4 inches of mercury, absolute, to a temperature between 90° F. and 140° F. while retaining a large percentage of the moisture present in said mass whereby said fat is liquefied and said mass deaerated,, elevating the temperature of the deaerated mass to between 145° F. and 180° F. out of contact with air and then mechanically separating the liquid fat from the tissue content of said mass.

10. A process of recovering the fat content of the adipose tissues of animals comprising; cutting the pieces of adipose tissue removed from animals into small chunks, disintegrating said small chunks so as to rupture the walls of substantially all of the fat cells thereof, heating the resulting mass under a vacuum to a temperature between 90° F. and 140° F. while retaining a large percentage of the moisture present in said mass whereby said fat is liquefied and said mass deaerated, elevating the temperature of the deaerated mass to between 145° F. and 180° F. out of contact with air and then mechanically separating the liquid fat from the tissue content of said mass.

11. A process of recovering the fat content from the fatty tissue of animals comprising; mechanically disintegrating the fatty tissue at substantially atmospheric pressure and in the absence of any added liquid so as to rupture the walls of substantially all of the fat cells thereof, heating the resulting mass in vacuum to a temperature sufficient to liquefy said fat while retaining a large percentage of the moisture present in said mass, said vacuum being sufficient to deaerate said mass, replacing said vacuum with an atmosphere of nitrogen at substantially atmospheric pressure, elevating the temperature of the nitrogen blanketed mass to a temperature sufficient to cause coagulation of the protein content of said mass, and mechanically separating the liquid fat from the tissue content of the mass.

12. A process of recovering the fat content from the adipose tissue of animals comprising; disintegrating the scraps of adipose tissue removed from the carcass during slaughtering to a finely ground, creamy consistency so as to rupture the walls of substantially all of the fat cells thereof, heating said ground tissue under a vacuum to a temperature high enough to liquefy the fat content thereof but no higher than 140° F. while retaining a large percentage of the moisture present in said mass, said vacuum being sufficient to deaerate said mass, heating the liquid mass out of contact with air to a temperature sufficient to coagulate the protein content of said mass but no higher than 180° F., and then separating such coagulated protein portion from said liquid fat.

13. A process of recovering the fat content from the fatty tissue of animals comprising; heating said fatty tissue in water to a temperature sufficient to denature the fat-splitting enzymes, mechanically disintegrating said fatty tissue so as to rupture the walls of substantially all of the fat cells thereof, subjecting the resulting mass to a vacuum to deaerate the mass while at temperature sufficient to liquefy the fat content thereof while retaining a large percentage of the moisture present in said mass, subjecting said deaerated mass to a temperature sufficient to coagulate the tissue content thereof and separating the liquid fat from the tissue content of the mass.

14. A process of recovering the fat content from the fatty tissue of animals comprising; heating said fatty tissue in water to a temperature of about 180° F. and continuing said heating for about 20 minutes, mechanically disintegrating said tissue so as to rupture the walls of substantially all of the fat cells thereof, subjecting the resulting mass to a vacuum while at a temperature sufficient to liquefy the fatty content while retaining a large percentage of the moisture present in said mass, subjecting the deaerated mass to a temperature sufficient to coagulate the proteinaceous tissue and then mechanically separating the liquid fat from the proteinaceous tissue.

15. A process of recovering the fat content from the fatty tissue of animals, comprising: treating said fatty tissue to denature the fat-splitting enzymes, mechanically disintegrating said fatty tissue so as to rupture the walls of subsantially all of the fat cells thereof, subjecting the resulting mass to a vacuum to deaerate the mass while at a temperature sufficient to liquefy the fat content thereof while retaining a large percentage of the moisture present in said mass, replacing said vacuum with an atmosphere of inert gas, subjecting said deaerated mass to a temperature sufficient to coagulate the tissue content thereof and separating the liquid fat from the tissue content of the mass.

References Cited in the file of this patent

UNITED STATES PATENTS

| 2,223,724 | Godfrey et al. | Dec. 3, 1940 |
| 2,388,284 | Ratner | Nov. 6, 1945 |
| 2,467,529 | Hormel | Apr. 19, 1949 |
| 2,504,507 | Dunkley | Apr. 18, 1950 |
| 2,616,910 | Pavia | Nov. 4, 1952 |
| 2,697,112 | Kramer | Dec. 14, 1954 |

OTHER REFERENCES

Hormel et al.; abstract of application Serial No. 606,170, published June 26, 1951.